United States Patent
Porter

(10) Patent No.: US 6,942,908 B2
(45) Date of Patent: *Sep. 13, 2005

(54) ANTIFOG/BARRIER LAMINATE FOR USE IN MEAT PACKAGING

(75) Inventor: Simon J. Porter, Allentown, PA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/812,160

(22) Filed: Mar. 29, 2004

(65) Prior Publication Data

US 2004/0180165 A1 Sep. 16, 2004

Related U.S. Application Data

(63) Continuation of application No. 10/081,473, filed on Feb. 22, 2002, now Pat. No. 6,726,968.

(51) Int. Cl.[7] .......................... B29D 22/00; B29D 23/00; B65B 53/00
(52) U.S. Cl. .................... 428/35.2; 428/34.9; 428/35.4
(58) Field of Search .............................. 428/34.9, 35.2, 428/35.4

(56) References Cited

U.S. PATENT DOCUMENTS

| | | | | |
|---|---|---|---|---|
| 4,501,798 A | * | 2/1985 | Koschak et al. ............ 428/349 |
| 4,640,852 A | * | 2/1987 | Ossian ....................... 428/35.4 |
| 5,520,764 A | | 5/1996 | Toney et al. ............ 156/244.17 |
| 5,567,533 A | | 10/1996 | Toney et al. ............. 428/475.5 |
| 5,837,358 A | * | 11/1998 | Bauer et al. ................. 428/213 |
| 5,919,547 A | | 7/1999 | Kocher et al. .............. 428/138 |
| 6,106,935 A | * | 8/2000 | Lambert et al. ............ 428/220 |
| 6,110,600 A | | 8/2000 | Ramesh ................... 428/476.9 |
| 6,342,282 B1 | * | 1/2002 | Yoshii et al. ............... 428/35.9 |
| 6,444,758 B2 | * | 9/2002 | McNamara et al. ........ 525/302 |
| 6,447,892 B1 | * | 9/2002 | Hatley et al. ............... 428/218 |

FOREIGN PATENT DOCUMENTS

| | | |
|---|---|---|
| EP | 0692374 | 1/1996 |
| EP | 0801096 | 10/1997 |
| JP | 09239889 | 9/1997 |
| WO | WO 98/25760 | 6/1998 |

* cited by examiner

*Primary Examiner*—Harold Pyon
*Assistant Examiner*—Patricia L. Nordmeyer
(74) *Attorney, Agent, or Firm*—Virginia Szigeti

(57) ABSTRACT

A multilayered packaging film having good antifog performance that is suitable for use in food packaging. The multilayered film comprises a nylon film having first and second surfaces; a sealant film positioned on the first surface of the nylon film, either directly on the first surface of the nylon film or via an intermediate adhesive; an antifog composition contained within at least part of the sealant film or coated on a surface of the sealant film opposite the nylon film; and a protective film applied onto the second surface of the nylon film.

11 Claims, No Drawings

ANTIFOG/BARRIER LAMINATE FOR USE IN MEAT PACKAGING

This is a continuation of application Ser. No. 10/081,473, filed Feb. 22, 2002 and now U.S. Pat. No. 6,726,968.

BACKGROUND OF THE INVENTION

1. Field of the Invention

The invention relates to packaging films. More particularly, the invention pertains case ready packaging films having good antifog performance that are suitable for use in meat packaging.

2. Description of the Related Art

Containers have long been used to store perishable foods, such as meats, fruits and vegetables, prior to sale in the marketplace to consumers. Maximizing the time in which the food remains preserved in the containers minimizes the amount of spoilage.

The environment around which the food is preserved is an important factor in the preservation process. It is important that the food is maintained at an adequate temperature, while also controlling the molecular and chemical content of the gases surrounding the food. By providing an appropriate gas content to the environment surrounding the food, the food can be better preserved when maintained at the proper temperature or even when it is exposed to variations in temperature. This gives the food producer some assurance that the food will be in an acceptable condition when it reaches the consumer. Preferred modified atmosphere packaging systems for foods, including raw meats, exposes these foods to extremely low levels of oxygen because it is well known that the freshness of meat can be preserved longer under anaerobic conditions than under aerobic conditions. Maintaining low levels of oxygen minimizes the growth and multiplication of aerobic bacteria. Additionally, modified atmosphere packaging can involve high levels of oxygen (80%) combined with nitrogen and/or carbon dioxide. The gases in these combinations do not favor bacterial growth but allow the raw meat to maintain a preferred red color that is acceptable to the consumer.

It is also important that the packaging exhibit good resistance to the formation of condensation inside the package on a surface of the film. This is known in the art as an antifog property. Multilayered films for modified atmosphere packaging having such antifog properties are well known and are commonly used when packaging food products having a high moisture content, such as fresh meats, and when it is important for the product to be clearly visible to the consumer. For example, U.S. Pat. No. 5,766,772 describes multi-layer heat-shrinkable films endowed with antifog properties having a different structure from this invention.

To produce a film exhibiting this antifog property, an antifog component is typically blended with or coated onto a sealant film such as a polyethylene film. This antifog-polyethylene component then forms a part of a multilayered packaging film, such as a nylon packaging film, that may also incorporate an oxygen barrier polymer layer such as ethylene vinyl alcohol. However, one significant problem associated with such known multilayered films having this antifog component is that the antifog component tends to be drawn toward polar materials, such as nylon, and away from the non-polar polyethylene. This is particularly a problem when the film is rolled up after manufacture such that the antifog layer or antifog containing polyethylene layer is brought into direct contact with an adjacent nylon layer. This causes the antifog component to migrate out of its existing polyethylene layer and into the nylon layer, compromising the performance of the nylon layer as well as degrading the antifog property of the film. Therefore, it would be desirable to have a multilayered packaging film having good antifog performance and having an antifog component which does not migrate into adjacent nylon layers when stored. The present invention provides such a solution to this need.

SUMMARY OF THE INVENTION

The invention provides a multilayered film comprising:
a) a nylon film having first and second surfaces;
b) a sealant film, positioned on the first surface of the nylon film, either directly on the first surface of the nylon film or via an intermediate adhesive;
c) an antifog composition contained within at least part of the sealant film or coated on a surface of the sealant film opposite the nylon film; and
d) a protective film applied onto the second surface of the nylon film.

The invention also provides a multilayered film comprising:
a) a first nylon layer having first and second surfaces;
b) an ethylene vinyl alcohol layer positioned on the first surface of the nylon layer;
c) a second nylon layer positioned on a surface of the ethylene vinyl alcohol layer opposite the first nylon layer;
d) a polyethylene sealant film, positioned on a surface of the second nylon layer which is opposite to the ethylene vinyl alcohol layer;
e) an antifog composition contained within the sealant film or coated on a surface of the sealant film which is opposite the second nylon layer; and
f) a polyurethane protective film applied on the second surface of the first nylon film.

The invention further provides a process for forming a multilayered film comprising:
a) positioning a sealant film onto a first surface of a nylon film, wherein the sealant film has an antifog composition which is either incorporated therein or coated on a surface of the sealant film opposite the nylon film; and
b) applying a protective film onto a second surface of the nylon film.

The invention still further provides a food package which comprises a container having an open portion and a multilayered film sealing the open portion, which multilayered film comprises:
a) a nylon film having first and second surfaces;
b) a sealant film, positioned on the first surface of the nylon film, either directly on the first surface of the nylon film or via an intermediate adhesive;
c) an antifog composition contained within at least part of the sealant film or coated on a surface of the sealant film opposite the nylon film; and
d) a protective film applied onto the second surface of the nylon film; the multilayered film being positioned such that the protective film is away from the open portion of the container.

The invention therefore provides a desirable multilayered packaging film having good antifog performance and having an antifog component which does not migrate into adjacent nylon layers when stored.

DETAILED DESCRIPTION OF THE PREFERRED EMBODIMENTS

The invention provides a multilayered packaging film having good antifog properties wherein the antifog composition does not migrate into adjacent polar film layers. In the production of a multilayered film according to the invention, a nylon film having first and second surfaces is positioned on a surface of a sealant film, either directly on the first surface of the nylon film or via an intermediate adhesive layer. An antifog composition is contained within at least part of the sealant film or coated on a surface of the sealant film that is opposite to the nylon film, i.e. a surface different than the surface to which the nylon film is attached. A protective film is also applied onto the second surface of the nylon film opposite the sealant film. This film exhibits good, permanent antifog properties and avoids migration of the antifog composition out of the sealant film.

Nylons are conventionally used in the art of multilayered packaging films. Suitable nylons within the scope of the invention non-exclusively include homopolymers or copolymers selected from aliphatic polyamides and aliphatic/aromatic polyamides having a molecular weight of from about 10,000 to about 100,000. General procedures useful for the preparation of polyamides are well known to the art. Such include the reaction products of diacids with diamines. Useful diacids for making polyamides include dicarboxylic acids which are represented by the general formula

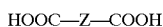

wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid. Suitable diamnines for making polyamides include those having the formula

wherein n has an integer value of 1–16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulfone, 4,4'-diaminodiphenylmethane, alkylated diamines such as 2,2-dimethylpentamethylenediamine, 2,2,4-trimethylhexamethylenediamine, and 2,4,4 trimethylpentamethylenediamine, as well as cycloaliphatic diamines, such as diaminodicyclohexylmethane, and other compounds. Other useful diamines include heptamethylenediamine, nonamethylenediamine, and the like.

Useful polyamide homopolymers include poly(4-aminobutyric acid)(nylon 4), poly(6-aminohexanoic acid)(nylon 6, also known as poly(caprolactam)), poly(7-aminoheptanoic acid)(nylon 7), poly(8-aminooctanoic acid)(nylon 8), poly(9-aminononanoic acid)(nylon 9), poly(10-aminodecanoic acid)(nylon 10), poly(11-aminoundecanoic acid)(nylon 11), poly(12-aminododecanoic acid)(nylon 12), nylon 4,6, poly(hexamethylene adipamide)(nylon 6,6), poly(hexamethylene sebacamide)(nylon 6,10), poly(heptamethylene pimelamide)(nylon 7,7), poly(octamethylene suberamide)(nylon 8,8), poly(hexamethylene azelamide) (nylon 6,9), poly(nonamethylene azelamide)(nylon 9,9), poly(decamethylene azelamide)(nylon 10,9), poly(tetramethylenediamine-co-oxalic acid)(nylon 4,2), the polyamide of n-dodecanedioic acid and hexamethylenediamine (nylon 6,12), the polyamide of dodecamethylenediamine and n-dodecanedioic acid (nylon 12,12) and the like. Useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Also included are other nylons which are not particularly delineated here. Of these polyamides, preferred polyamides include nylon 6, nylon 6,6, nylon 6/6,6 as well as mixtures of the same.

Aliphatic polyamides used in the practice of this invention may be obtained from commercial sources or prepared in accordance with known preparatory techniques. For example, poly(caprolactam) can be obtained from Honeywell International Inc., Morristown, N.J. under the trademark CAPRON®.

Exemplary of aliphatic/aromatic polyamides include poly (tetramethylenediamine-co-isophthalic acid)(nylon 4,I), polyhexamethylene isophthalamide(nylon 6,I), hexamethylene adipamide/hexamethylene-isophthalamide(nylon 6,6/6I), hexamethylene adipamide/hexamethylene-terephthalamide(nylon 6,6/6T), poly (2,2,2-trimethyl hexamethylene terephthalamide), poly(m-xylylene adipamide) (MXD6), poly(p-xylylene adipamide), poly (hexamethylene terephthalamide), poly(dodecamethylene terephthalamide), polyamide 6T/6I, polyamide 6/MXDT/I, polyamide MXDI, and the like. Blends of two or more aliphatic/aromatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267, which are incorporated herein by reference.

Positioned on a surface of the nylon film is a heat sealable sealant film which improves the ability of the multilayered film to be sealed onto a package. The sealant film is preferably comprised of polyethylene, and has an antifog composition that is either combined with the polyethylene or coated on a surface of the sealant film opposite the nylon film. Non-limiting examples of suitable polyethylenes are low density polyethylene (LDPE), linear low density polyethylene (LLDPE), linear medium density polyethylene (LMDPE), linear very-low density polyethylene (VLDPE), linear ultra-low density polyethylene (ULDPE), metallocene linear low density polyethylene (MLLDPE) high density polyethylene (HDPE). Of these, the most preferred is linear low density polyethylene.

The antifog composition prevents condensation on the film when used to package products such as fresh meats, vegetables, etc. Non-limiting examples of antifog compositions are glycerol monoesters of a saturated or unsaturated fatty acid having from about 8 to about 20 carbon atoms, glycerol diesters of a saturated or unsaturated fatty acid having from about 8 to about 20 carbon atoms and ionic surfactants having phosphate, sulfate or quaternary amine functional end groups. Also suitable as antifog compositions are surfactants including anionic, cationic, nonionic and amphoteric surfactants. Suitable ionic surfactants have phosphate, sulfate or quaternary amine functional end groups. Other antifog compositions include sorbitan esters of aliphatic carboxylic acids, glycerol esters of aliphatic carboxylic acids, esters of other polyhydric alcohols with aliphatic carboxylic acids, polyoxyethylene compounds, such as the polyoxyethylene sorbitan esters of aliphatic carboxylic acids and polyoxyethylene ethers of higher aliphatic alcohols. Preferred antifog compositions are glycerol monooleate, glycerol monostearate, sorbitan esters and blends thereof. When the antifog composition is incorporated into the sealant film, it is blended into the polyethylene composition preferably in an amount of from about 0.1 weight percent to about 5 weight percent. When the antifog composition is coated on the sealant film it is preferably applied at a coating weight of from about 0.2 to about 0.6 g/m$^2$. Suitable antifog compositions are described, for example, in U.S. Pat. No. 5,766,772.

In an alternate embodiment of the invention, the sealant film may be comprised of a combination of various individual layers in addition to polyethylene. For example, the sealant film may comprise a structure comprising a heat sealable first polyethylene layer, an ethylene vinyl alcohol layer, a second polyethylene layer and an antifog layer (or an antifog composition containing second polyethylene layer). In yet another embodiment, the sealant film may comprise a structure comprising a polyolefin layer, a first polyethylene layer, an adhesive tie layer, an ethylene vinyl alcohol layer, another adhesive tie layer, a second polyethylene layer and an antifog composition containing third polyethylene layer. These structures may be formed either by lamination or by coextrusion of the individual layers.

In the latter embodiment, suitable polyolefins include polymers of alpha-olefin monomers having from about 2 to about 6 carbon atoms and includes homopolymers, copolymers (including graft copolymers), and terpolymers of alpha-olefins. Illustrative homopolymer examples include ultra low density (ULDPE), low density (LDPE), linear low density (LLDPE), medium density (MDPE), or high density polyethylene (HDPE); polypropylene; polybutylene; polybutene-1; poly-3-methylbutene-1; poly-pentene-1; poly-4-methylpentene-1; polyisobutylene; and polyhexene.

Polyolefins such as polyethylenes are commonly differentiated based on the density which results from their numbers of chain branches per 1,000 carbon atoms in the polyethylene main chain in the molecular structure. Branches typically are $C_3$–$C_8$ olefins, and which are preferably butene, hexene or octene. For example, HDPE has very low numbers of short chain branches (less than 20 per 1,000 carbon atoms), resulting in a relatively high density, i.e. density ranges from about 0.94 gm/cc to about 0.97 gm/cc. LLDPE has more short chain branches, in the range of 20 to 60 per 1,000 carbon atoms with a density of about 0.91 to about 0.93 gm/cc. LDPE with a density of about 0.91 to about 0.93 gm/cc has long chain branches (20–40 per 1,000 carbon atoms) instead of short chain branches in LLDPE and HDPE. ULDPE has a higher concentration of short chain branches than LLDPE and HDPE, i.e. in the range of about 80 to about 250 per 1,000 carbon atoms and has a density of from about 0.88 to about 0.91 gm/cc.

Illustrative copolymer and terpolymers include copolymers and terpolymers of alpha-olefins with other olefins such as ethylene-propylene copolymers; ethylene-butene copolymers; ethylene-pentene copolymers; ethylene-hexene copolymers; and ethylene-propylene-diene copolymers (EPDM). Preferred polyolefins are those prepared from alpha-olefins, and are most preferably ethylene polymers, copolymers, and terpolymers. The above polyolefins may be obtained by any known process. The polyolefin may have a weight average molecular weight of about 1,000 to about 1,000,000, and preferably about 10,000 to about 500,000. Preferred polyolefins are polyethylene, polypropylene, polybutylene and copolymers, and blends thereof. The most preferred polyolefin is polyethylene.

Suitable polyethylenes are those described above. This polyethylene layer may be attached to an ethylene vinyl alcohol layer, preferably via an intermediate adhesive tie layer. Suitable adhesive materials include polyurethanes, epoxies, polyesters, acrylics, anhydride modified polyolefin and blends thereof. Modified polyolefin compositions have at least one functional moiety preferably selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid an anhydride and the like. The adhesive layer may also optionally comprise a colorant, an ultraviolet light absorber or both. The adhesive layer may be applied either directly onto the nylon film or onto the polyethylene layer by any appropriate means in the art, such as by coating.

Ethylene vinyl alcohol compounds are well known in the art and readily commercially available. Copolymers of ethylene and vinyl alcohol suitable for use in the present invention can be prepared, for example, by the methods disclosed in U.S. Pat. Nos. 3,510,464; 3,560,461; 3,847,845; 3,595,740 and 3,585,177. The ethylene vinyl alcohol copolymer can be a hydrolyzed ethylene vinyl acetate copolymer. The degree of hydrolysis can range from about 85% to about 99.5%. The ethylene vinyl alcohol copolymer preferably contains from about 15 to about 65 mol percent ethylene and more preferably about 25 to about 50 mol percent ethylene. Copolymers of lower than 15 mol percent ethylene tend to be difficult to extrude while those above 65 mol percent ethylene have reduced oxygen barrier performance. The term "ethylene/vinyl alcohol copolymer" or "EVOH" is intended to comprise also the hydrolyzed or saponified ethylene/vinyl acetate copolymers and refers to a vinyl alcohol copolymer having an ethylene comonomer, which may be obtained, for example, by the hydrolysis of an ethylene/vinyl acetate copolymer or by chemical reaction of ethylene monomers with vinyl alcohol.

Applied onto an opposite surface of the nylon film is a protective film. This protective film may comprise a material selected from the group consisting of polyurethane, polyvinylidene chloride (with or without a primer), acrylics, polyester polyols, and amine modified polyurethanes. Suitable primers include acrylics, urethanes, polyester polyols or amine modified polyurethanes.

These materials may be crosslinked with suitable crosslinking agents as is well known in the art. Suitable crosslinking agents include but are not limited to aromatic diisocyanates, such as toluene diisocyanate, aliphatic diisocyanates, such as hexamethylene diisocyanate, glycol adducts of isocyanates, prepolymers made from isocyanate monomers and butylated-melamine or methylated-melamine formaldehydes. In an additional embodiment of the invention, a layer of a polyvinylidene chloride may optionally be applied onto a surface of the protective film that is not adjacent to the nylon film.

In the preferred embodiment of the invention the protective film is coated onto the outer surface of the nylon film which is opposite the surface at which the sealant film is attached. Suitable coating methods include dip coating, meniscus coating, roller coating, doctor blade coating, and the like which are well known in the art.

Each of the nylon film, sealant film and protective film may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, release agents, flame-retarding agents, oxidation inhibitors, oxidation scavengers, dyes, pigments and other coloring agents, ultraviolet light absorbers and stabilizers, organic or inorganic fillers including particulate and fibrous fillers, reinforcing agents, nucleators, plasticizers, as well as other conventional additives known to the art. Such may be used in amounts, for example, of up to about 10% by weight of the overall composition. Representative ultraviolet light stabilizers include various substituted resorcinols, salicylates, benzotriazole, benzophenones, and the like. Suitable lubricants and release agents include stearic acid, stearyl alcohol, and stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benzylnesulfonamide, and combinations of any of the above, as well as other plasticizers known to the art.

Each of the layers may be joined together by coextrusion. In the coextrusion process, for example, the polymeric material for the individual layers are fed into infeed hoppers of a like number of extruders, each extruder handling the material for one or more of the layers. The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Additional rolls may be employed. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. Typical coextrusion techniques are described in U.S. Pat. Nos. 5,139,878 and 4,677,017.

Alternately the individual films may first be formed as separate layers and then laminated together under heat and pressure with or without intermediate adhesive layers. Lamination techniques are well known in the art. Typically, laminating is done by positioning the individual layers on one another under conditions of sufficient heat and pressure to cause the layers to combine into a unitary film. Typically the nylon film and the antifog composition containing sealant film will be positioned on one another, and the combination is passed through the nip of a pair of heated laminating rollers by techniques well known in the art. Lamination heating may be done at temperatures ranging from about 120° C. to about 175° C., preferably from about 150° C. to about 175° C., at pressures ranging from about 5 psig (0.034 MPa) to about 100 psig (0.69 MPa), for from about 5 seconds to about 5 minutes, preferably from about 30 seconds to about 1 minute. Further, when the sealant film comprises the multilayered structure described above, it is preferred that the individual layers are laminated together. However, it is most preferred that the nylon film be coextruded.

In one embodiment of the invention, the nylon film is oriented prior to being attached to the sealant film. For the purposes of the present invention the term draw ratio is an indication of the increase in the dimension in the direction of draw. Preferably, in the present invention the nylon film is drawn to a draw ratio of from 1.5:1 to 5:1 uniaxially in at least one direction, i.e. its longitudinal direction, its transverse direction or biaxially in each of its longitudinal and transverse directions. Preferably, the nylon film is simultaneously biaxially oriented, for example orienting a plasticized film in both the machine and transverse directions at the same. This results in dramatic improvements in clarity strength and toughness properties. Preferably, the nylon film is biaxially oriented and is not heat set so that it is shrinkable both in its transverse and longitudinal directions.

Although each layer of the multilayer film structure may have a different thickness, the thickness of the nylon film is preferably from about 1 μm to about 25 μm, more preferably from about 3 μm to about 8 μm, and most preferably from about 4 μm to about 6 μm. The thickness of the protective film is preferably from about 1 μm to about 25 μm, more preferably from about 2 μm to about 8 μm and most preferably from about 3 μm to about 5 μm. The thickness of the sealant film is preferably from about 1 μm to about 50 μm, more preferably from about 10 μm to about 30 μm, and most preferably from about 12 μm to about 25 μm. If a multicomponent sealant film is included rather than an individual antifog containing polyethylene layer, the thickness of that multicomponent sealant film is preferably within this range. While such thicknesses are preferred, it is to be understood that other film thicknesses may be produced to satisfy a particular need and yet fall within the scope of the present invention.

The oxygen transmission rate (OTR) of the multilayered film of the invention may be determined via the procedure of ASTM D-3985. In the preferred embodiment, the multilayered film according to this invention has an OTR of about 0.5 cc/100 in$^2$/day or less, preferably from about 0.1 cc/100 in$^2$/day or less and more preferably from about 0.05 cc/100 in$^2$/day or less at 65% relative humidity at 20° C.

The multilayered film of the invention is preferably heat shrinkable, generally by an amount of from about 2% to about 30%, more preferably from about 10% to about 20% in its length, or its width or each of its length and width. To provide a tightly adhering lid for a tray, for example, the film only need to exhibit shrinkage on the order of about 2 to about 3%. However, in order to have the film also -form (unrestrained) about the side of the tray, higher shrinkage in the film is desirable. The multilayered film may further have printed indicia on the nylon film. Since such printing is on an internal surface of the structure, it will not rub off when the surface is contacted. Optionally, the multilayered film may be uniaxially or biaxially oriented in a manner and in an amount indicated above for the nylon film and is not heat set so that it is shrinkable both in its transverse and longitudinal directions. In this case the nylon film may or may not have been oriented already.

The film preferably has a puncture resistance of at least about 10 lbs. force as measured by ASTM F 1306, and preferably higher than 10 lbs. force. Preferably the film has a haze of about 4% or less and a clarity of about 92% or higher as measured by ASTM D1003.

The multilayered film may be formed into and stored as a roll. It has been found that the unique structure of this inventive film is particularly effective in preventing the migration of the antifog material from the polyethylene of the sealant film to the nylon film when in roll form.

The multilayered film is useful for forming a food package including a container, such as a tray, having an open portion and the multilayered film sealing the open portion. Such a structure is generally referred to a lidding or packaging film. Such containers are suitable for packaging a variety of raw meats such as beef, pork, poultry, and veal, among others. A packaged food may comprises the food package and a food product such as a meat in the food package.

The container may have enclosed side walls, a floor and an top opening defining a central cavity wherein the open top optionally has a substantially flat peripheral rim. The multilayered film surrounds the container and is heat shrunk and heat sealed to it such that the antifog composition is on the open portion (facing inward) and the protective film is facing away from the open portion of the container. The container may comprise a material such as cardboard, paperboard, boardstock, a plastic and combinations thereof. Preferred plastics include any one of several thermosetting or thermoplastic resins any of which are capable of sealing to the lidding material. Examples of materials include acrylonitrile, an acrylic polymer, polyethylene terephthalate (PET) or copolymers thereof, polyvinyl chloride, polycarbonate, polystyrene and polypropylene. In use the multilayered film is positioned around the open portion and is caused to shrink, e.g. by the application of heat, by a sufficient amount to seal the open portion of the container.

The invention further contemplates additional layers being attached to the multilayered film either before or after attaching the nylon film. For example, the nylon film of the invention may comprise a single nylon layer, or may also comprise additional layers. In particular, the nylon film may comprise a structure comprising a first nylon layer, an ethylene vinyl alcohol layer and a second nylon layer. In this embodiment, an ethylene vinyl alcohol layer is positioned onto a first surface of a first nylon layer, a second nylon layer is positioned on a surface of the ethylene vinyl alcohol layer opposite the first nylon layer, a sealant film is positioned on a surface of the second nylon layer opposite the ethylene vinyl alcohol layer, and a protective film is applied on a second surface of the first nylon film. Additionally, an antifog composition is preferably either contained within at least part of the sealant film or coated on a surface of the sealant film opposite the second nylon layer. In this embodiment, each of the layers are preferably attached by coextrusion, but may also be attached by lamination with or without an intermediate adhesive layer.

The following non-limiting examples serve to illustrate the invention.

EXAMPLES

In the following examples, the sealant film is a monolayer film of a metallocene linear low density polyethylene. The polyethylene is blended with an antifog-containing polyethylene masterbatch prior to extrusion. The material is dry laminated to a variety of nylon films (coated and uncoated) using a two component polyurethane adhesive applied to the nylon film.

Evidence for antifog migration is measured by the surface contact angle of water on both the polyethylene and nylon surfaces. The antifog performance is determined from a modification of a cold fog test procedure. Film is stretched over a polypropylene tray containing 30 ml of water soaked into a paper towel. The package is placed in a refrigerator at 4° C. and monitored for a period of 24 hours. At given intervals the inside surface of the film is visually examined and rated according to the following, with a score of above 8 being acceptable:

| Grade | Antifog Performance |
|---|---|
| 0 | Fine fog across entire surface. Difficult to view product |
| 2 | Small droplets (1–2 mm). Product somewhat obscured. |
| 4 | Medium droplets (2–4 mm). |
| 6 | Large drops (>4 mm). |
| 8 | Moisture visible but fairly uniform w/some texture or large drops. |
| 10 | Indistinguishable from dry film over entire package. |

Example 1 (Comparative)

The sealant film (with either 20% or 40% antifog masterbatch added) was laminated to a film of biaxially oriented nylon 6 (Capran® Emblem available from Honeywell International Inc.), formed into a roll, and left to sit for a period of 72 hours. The results are shown below:

| Material | Test Data | 20% Antifog Masterbatch | 40% Antifog Masterbatch |
|---|---|---|---|
| As Made | PE Surface Contact Angle | <10° | <10° |
|  | Antifog Performance Rating | 8 | 9 |
| After Contact | PE Surface Contact Angle | 39.3° | 29° |
|  | Antifog Performance Rating | 6 | 6 |

Example 2

The sealant film (with either 20% or 40% antifog masterbatch added) was laminated to a film of polyvinylidene chloride (PVdC) coated, biaxially oriented nylon 6 (Capran® Emblem), formed into a roll, and left to sit for a period of 72 hours. The PVdC had a polyurethane primer coating. The results are shown below:

| Material | Test Data | 20% Antifog Masterbatch | 40% Antifog Masterbatch |
|---|---|---|---|
| As Made | PE Surface Contact Angle | <10° | <10° |
|  | Antifog Performance Rating | 8 | 9 |
| After Contact | PE Surface Contact Angle | 33.3° | 32.3° |
|  | Antifog Performance Rating | 8 | 10 |

Example 3

The sealant film (with either 20% or 40% antifog masterbatch added) was laminated to a film of polyurethane coated, biaxially oriented nylon 6 (Capran® Emblem), formed into a roll, and left to sit for a period of 72 hours. The results are shown below:

| Material | Test Data | 20% Antifog Masterbatch | 40% Antifog Masterbatch |
|---|---|---|---|
| As Made | PE Surface Contact Angle | <10° | <10° |
| | Antifog Performance Rating | 8 | 9 |
| After Contact | PE Surface Contact Angle | 32° | 40° |
| | Antifog Performance Rating | 8 | 9 |

Example 4 (Comparative)

The sealant film (with an antifog wash coat) was similarly laminated to a biaxially oriented nylon 6 film as described in Examples 1–3, formed into rolls, and left to sit for a period of 72 hours. The results are shown below:

| Material | Test Data | As Made | After Contact with Ex. 1 Film | After Contact with Ex. 2 Film | After Contact with Ex. 3 Film |
|---|---|---|---|---|---|
| Example 4 | PE Surface Contact Angle | <10° | 65° | <10° | <10° |
| | Antifog Performance Rating | 9 | 3 | 8 | 9 |

As is clearly demonstrated in the examples, the use of the protective coatings of this invention can greatly diminish the transfer of the active antifog component from the polyethylene surface, to the nylon surface of a polyethylene/nylon skinned structure.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A food package which comprises a container having an open portion and a multilayered film sealing the open portion, which multilayered film consists essentially of:
    a) a nylon film having first and second surfaces;
    b) a sealant film, positioned on the first surface of the nylon film, either directly on the first surface of the nylon film or via an intermediate adhesive;
    c) an antifog composition contained within at least part of the sealant film or coated on a surface of the sealant film opposite the nylon film; and
    d) a protective film applied onto the second surface of the nylon film, said protective film being selected from the group consisting of polyvinylidene chloride, polyurethanes; amine modified polyurethanes, epoxies, polyesters, acrylics, polyols and combinations thereof;
    the multilayered film being positioned such that the protective film is away from the open portion of the container.

2. The food package of claim 1 wherein the nylon film comprises nylon 6.

3. A packaged food which comprises to food package of claim 1 and a food product in the food package.

4. The food package of claim 1 wherein said sealant film comprises a polyethylene.

5. The food package of claim 1 wherein said protective film comprises a polyvinylidene chloride.

6. The food package of claim 1 wherein said protective film comprises a polyurethane.

7. The packaged food of claim 3 wherein the food product comprises a meat.

8. A packaged food which comprises a container having an open portion and a multilayered film sealing the open portion, which multilayered film consists essentially of:
    a) a first nylon layer having first and second surfaces;
    b) an ethylene vinyl alcohol layer positioned on the first surface of the nylon layer;
    c) a second nylon layer positioned on a surface of the ethylene vinyl alcohol layer opposite the first nylon layer;
    d) a polyethylene sealant film, positioned on a surface of the second nylon layer which is opposite to the ethylene vinyl alcohol layer;
    e) an antifog composition contained within the sealant film or coated on surface of the sealant film which is opposite the second nylon layer; and
    f) a protective film applied on the second surface of the first nylon film, said protective film being selected from the group consisting of polyvinylidene chloride, polyurethanes, amine modified polyurethanes, epoxies, polyesters, acrylics, polyols and combinations thereof;
    the multilayered film being positioned such that the protective film is away from the open portion of the container.

9. The packaged food of claim 8 wherein said protective film comprises a polyvinylidene chloride.

10. The packaged food of claim 8 wherein said protective film comprises a polyurethane.

11. The packaged food of claim 8 wherein said each of said first and second nylon layers comprises a nylon 6 film.

* * * * *